UNITED STATES PATENT OFFICE.

HANS LABHARDT, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING ZINC FORMALDEHYDE HYDROSULFITE.

No. 871,600.    Specification of Letters Patent.    Patented Nov. 19, 1907.

Application filed October 2, 1906. Serial No. 337,104.

*To all whom it may concern:*

Be it known that I, HANS LABHARDT, doctor of philosophy and chemist, citizen of the Swiss Republic, residing at Mannheim, Germany, have invented new and useful Improvements in Making Zinc Formaldehyde Hydrosulfite, of which the following is a specification.

In the specification of the application for Letters Patent Serial No. 298,866 it is stated that by passing a current of gaseous sulfur dioxid into a suspension of zinc dust in aqueous formaldehyde solution and, either by heating to a temperature of about 100° C., or by prolonged stirring at ordinary temperature, a difficultly soluble zinc formaldehyde sulfoxylate can be obtained.

I have now discovered that the reaction can be carried out so that a product is yielded which is an easily soluble zinc formaldehyde hydrosulfite if the aforesaid components be allowed to react on one another while either cooling, or at ordinary temperature, or while avoiding strongly heating, in any case below fifty (50) degrees centigrade, and the reaction be stopped before the difficultly soluble zinc formaldehyde sulfoxylate begins to separate out. If the treatment be prolonged, less of the readily soluble salt and some of the difficultly soluble salt are obtained.

The following example will serve to illustrate how my invention can be performed, but it is not confined to this example. The parts are by weight. Suspend three hundred and fifty-seven and a half (357.5) parts of zinc dust in two thousand (2,000) parts of a fifteen (15) per cent. aqueous formaldehyde solution and, while well stirring, pass in a current of sulfur dioxid until the increase in weight is about six hundred and forty (640) parts. The temperature is preferably maintained, by cooling, at about twenty (20) degrees centigrade, but in any case it should not exceed fifty (50) degrees centigrade. On filtering off the residue of zinc dust and evaporating the filtrate *in vacuo* zinc formaldehyde hydrosulfite is obtained in the form of a thick syrup. The reaction can be regarded as taking place according to the following equation

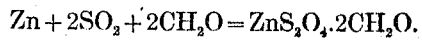

$$Zn + 2SO_2 + 2CH_2O = ZnS_2O_4 \cdot 2CH_2O.$$

If the aqueous solution be treated with sodium carbonate solution, zinc carbonate is precipitated and a solution of sodium formaldehyde hydrosulfite is obtained according to the equation

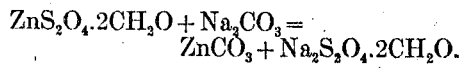

$$ZnS_2O_4 \cdot 2CH_2O + Na_2CO_3 = ZnCO_3 + Na_2S_2O_4 \cdot 2CH_2O.$$

If the aforementioned aqueous solution of the zinc salt be boiled with zinc dust, basic zinc formaldehyde sulfoxylate is obtained according to the equation

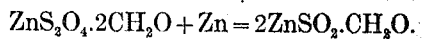

$$ZnS_2O_4 \cdot 2CH_2O + Zn = 2ZnSO_2 \cdot CH_2O.$$

The production of the easily soluble zinc formaldehyde hydrosulfite according to my invention can be carried out in alcoholic instead of in aqueous solution. Either dilute, or ordinary concentrated spirit can be employed. The temperature in this case also must not exceed fifty degrees centigrade.

Now what I claim is:

The process of producing easily soluble zinc formaldehyde hydrosulfite by causing formaldehyde, zinc dust and sulfur dioxid to act on one another at a temperature below fifty degrees centigrade.

In testimony whereof I have hereunto set my hand in the presence of two subscribing witnesses.

HANS LABHARDT.

Witnesses:
 J. ALEC. LLOYD,
 H. W. HARRIS.